United States Patent [19]
Honeycutt et al.

[11] Patent Number: 6,162,852
[45] Date of Patent: Dec. 19, 2000

[54] DEGRADABLE POLYMERS

[75] Inventors: Travis W. Honeycutt, Gainesville; Baosheng Lee, Duluth; Feng Qin, Norcross; Robert S. Woody, Hiram, all of Ga.

[73] Assignee: Isolyser Company, Inc., Norcross, Ga.

[21] Appl. No.: 08/923,698

[22] Filed: Sep. 4, 1997

Related U.S. Application Data

[63] Continuation-in-part of application No. 08/766,765, Dec. 13, 1996, abandoned.

[51] Int. Cl.$^7$ .............................. C08L 33/02; C08L 23/08
[52] U.S. Cl. ..................... 524/423; 524/427; 524/430; 524/432; 524/433; 524/436; 524/443; 524/444; 524/445; 524/447; 524/448; 524/449; 524/450; 524/451; 524/456; 524/504; 524/508; 524/514; 524/522; 525/78; 525/148; 525/183; 525/221
[58] Field of Search ............................... 525/221, 78, 148, 525/183; 524/522, 423, 427, 430, 432, 433, 436, 443, 444, 445, 447, 448, 449, 450, 451, 456, 504, 508, 514

[56] References Cited

U.S. PATENT DOCUMENTS

| | | | |
|---|---|---|---|
| H582 | 2/1989 | Tucker | 524/522 |
| 3,762,454 | 10/1973 | Wilkins, Jr. . | |
| 4,355,125 | 10/1982 | Lakshmanan . | |
| 4,472,518 | 9/1984 | Patnode et al. . | |
| 4,540,736 | 9/1985 | Herten | 524/556 |
| 4,775,713 | 10/1988 | Homma et al. . | |
| 4,801,649 | 1/1989 | Statz | 525/183 |
| 4,868,024 | 9/1989 | Cross et al. . | |
| 4,965,319 | 10/1990 | Kawamoto | 525/194 |
| 5,143,961 | 9/1992 | Scholl | 524/317 |
| 5,198,301 | 3/1993 | Hager et al. | 428/355 |
| 5,284,489 | 2/1994 | Liu et al. | 606/228 |
| 5,292,794 | 3/1994 | Maginnis . | |
| 5,321,089 | 6/1994 | Cardoniga et al. | 525/196 |
| 5,322,878 | 6/1994 | Deibig et al. | 524/414 |
| 5,346,955 | 9/1994 | Sasse . | |
| 5,362,532 | 11/1994 | Famili | 428/515 |
| 5,378,751 | 1/1995 | Deibig et al. | 524/414 |
| 5,397,840 | 3/1995 | Sullivan et al. | 525/221 |
| 5,424,265 | 6/1995 | Weinstein . | |
| 5,429,874 | 7/1995 | Vanputte . | |
| 5,472,518 | 12/1995 | Patnode . | |
| 5,516,847 | 5/1996 | Sullivan et al. | 525/221 |
| 5,591,144 | 1/1997 | Smith et al. . | |
| 5,690,622 | 11/1997 | Smith et al. . | |

FOREIGN PATENT DOCUMENTS

| | | |
|---|---|---|
| 0 394 687 A2 | 3/1990 | European Pat. Off. . |
| 61-044937 | 3/1996 | Japan . |
| WO96/04077 | 2/1996 | WIPO . |
| WO96/20831 | 7/1996 | WIPO . |

*Primary Examiner*—David J. Buttner
*Attorney, Agent, or Firm*—Needle & Rosenberg, P.C.

[57] ABSTRACT

A hot alkaline liquid soluble or dispersable composition made from a first polymer of an ethylene-acrylic acid copolymer having an acrylic acid portion, an ethylene-methacrylic acid copolymer having a methacrylic acid portion, or a mixture thereof, where the acrylic acid portion and the methacrylic acid portion each, independently, comprise from 10 to 30 wt. % of the total copolymer weight and also including an Ionomer-type copolymer having an acrylic acid portion, a methacrylic acid portion, or a combination thereof, comprising from 10 to 30 wt. % of the total Ionomer copolymer weight. Methods of making articles from such compositions. Methods of disposal of such compositions in hot liquid and alkaline conditions. A method of disposing of a hot alkaline liquid soluble or dispersable product by contacting the product with a hot alkaline liquid for a period of time sufficient to dissolve or disperse the product, the product comprised of either a first polymer of an ethylene-acrylic acid copolymer having an acrylic acid portion, an ethylene-methacrylic acid copolymer having a methacrylic acid portion, or a mixture thereof, wherein the acrylic acid portion and the methacrylic acid portion each, independently, comprise from 10 to 30 wt. % of the total copolymer weight, an Ionomer copolymer having an acrylic acid portion, a methacrylic acid portion, or a combination thereof, comprising from 10 to 30 wt. % of the total Ionomer copolymer weight, or a mixture thereof.

11 Claims, 2 Drawing Sheets

DEGRADABLE POLYMERS

This application is a continuation-in-part of Applicants' U.S. Ser. No. 08/766,765, filed Dec. 13, 1996 now abandoned the contents of which are hereby incorporated in their entirety by this reference.

BACKGROUND OF THE INVENTION

1. Field of the Invention

The present invention relates to disposable polymers and articles made therefrom. In particular, the present invention provides hot liquid and alkaline soluble or dispersable polymers and methods of making and disposing of the same.

2. Background

The disposal of plastic articles presents a major cost to society. Plastics take longer to degrade than almost any other item routinely used and disposed of today. In addition, items often considered degradable may not actually degrade at all if placed in landfills and then covered with other debris, thereby preventing exposure to oxygen which is usually required for degradation.

In addition to a long degradation cycle, plastics often take up a disproportionate volume in the waste disposal process. Inherently light, and often bulky, plastics use more volume per pound than most other rigid materials.

The use of plastic items is common in the industrial environment. Films are often used to isolate areas in which potentially hazardous chemicals or items are being handled, cleaned up, or used, i.e., in nuclear power plants. Films can also be used to protect what is enclosed within the contained area, as is the case with paint rooms where films are used to protect the item being painted from dust and particulate matter. In both such cases, these films create problems in disposal due to their volume and also potentially hazardous materials being coated on them. As mentioned earlier, the light weight and bulkiness of these materials increase the cost per pound for their disposal.

Molded plastics also create disposal problems. Also light weight and bulky, these items have the added disadvantages that they are difficult to compact. Like films, molded items such as buckets and basins displace more dense items disposed of in landfills, drums, or other waste containers. The resulting cost per pound for disposal of this waste is increased since fewer pounds per cubic foot can be placed in the disposal container. If a container is used to hold a hazardous material, it must also be disposed of as hazardous waste. Since often disposal cost is governed by volume, the cost of disposing of a large, plastic item used in the handling of a hazardous material can actually exceed the purchase price of the item itself.

Burning plastics as a method of disposal is not preferred because burning can result in the emission of dioxins and other atmospheric pollutants. Most incinerator operators would prefer to dispose of waste which was free of plastics, since their potential contaminants would be decreased and lifetime of the incinerator increased. Also, as clean air regulations force the shutdown of waste incinerators, prices for the disposal of plastics by incineration should be expected to increase.

A dissolvable or dispersable polymer that can be converted into a film or molded into parts is ideal for solving these disposal issues. Even when contaminated with hazardous materials, technologies exist for the waste water to be cleaned prior to its return to the municipal water system. Then, not only would the volume of materials being disposed of outside the facility decrease, but so would the cost and pollution associated with transporting this waste to the disposal site. Worker exposure would be reduced by onsite disposal as the contaminated material would only need to be handled once. Cost could be reduced as a material once disposed of as hazardous waste would not be able to be sent down the drain. And, the potential exists for contaminants to be filtered and reconcentrated after processing allowing for their reuse in subsequent processes.

In the hospital setting, disposal of articles generates considerable quantities of infectious medical waste in primary and acute care facilities. There has been a general conversion in such settings away from reusable, cleanable items, to disposable items over the last three decades. This conversion has been made to promote antiseptic techniques in patient care and to decrease the potential for cross-infections between patients, staff and the general public. Recent federal and state government regulations such as the Medical Waste Tracking Act of 1988 and OSHA Medical Facility rules have resulted in a substantial increase in medical waste that must be classified as "infectious."

When a patient is admitted to a hospital, the patient produces approximately 55 pounds of medical waste per day. Approximately 20% of this waste is infectious. The current stated objective of the American Hospital Association and the Centers for Disease Control is to treat medical waste as soon as it is generated. Both organizations recognize that medical waste is primarily an occupational hazard for health care workers and not an environmental problem. The best way to handle infectious medical waste is to disinfect it at the point of generation and dispose of the treated medical waste with minimum on premises handling and storage. The need for an effective way to dispose of medical waste has been highlighted by the amendment made to 29 C.F.R. 1910.1030 which provides for the federal regulation under the Occupational Safety And Health Act, 29 U.S.C. 655, 657 to control blood borne pathogens. Specifically, the Act calls for the establishment of an exposure control plan, the containment of specimens of blood or other potentially infectious materials and the general tightening of precautionary measures to minimize the spread of disease. A safe and effective way to dispose of hospital waste would greatly facilitate compliance with the above-referenced Act.

As mentioned above, the disposal of many materials creates hazardous byproducts. Thus, it is highly desirable to provide a composition and articles made therefrom where the byproducts of the disposal process are non-toxic.

In addition, many articles currently disposed of in landfills and the like are not biodegradable and, therefore, present a significant long-term environmental hazard. It is therefore further desirable to provide compositions and articles made therefrom wherein the disposal process leads to biodegradable byproducts. In addition, it is highly desirable to provide articles which themselves are non-toxic and/or biodegradable.

Thus, there exists a need for articles capable of being disposed of after use while avoiding additional burdens being placed upon landfills and other disposal sites.

SUMMARY OF THE INVENTION

To fulfill these needs, the present invention provides disposable compositions and articles which are disposable only in a liquid, such as water, at above about 37° C. in an alkaline solution, preferably an aqueous solution, above pH 7.0.

In particular, the present invention provides a hot alkaline liquid soluble or dispersable composition comprising a first polymer of an ethylene-acrylic acid copolymer having an acrylic acid portion, an ethylene-methacrylic acid copolymer having a methacrylic acid portion, or a mixture thereof, wherein the acrylic acid portion and the methacrylic acid portion each, independently, comprise from 10 to 30 wt. % of the total copolymer weight, and an Ionomer copolymer having an acrylic acid portion, a methacrylic acid portion, or a combination thereof, comprising from 10 to 30 wt. % of the total Ionomer copolymer weight. In a further embodiment, the acrylic acid portion of the first polymer and the methacrylic acid portion of the first polymer each, independently, comprise from 15 to 25 wt. % of the total copolymer weight. In another embodiment, the acrylic acid portion of the Ionomer and the methacrylic acid portion of the Ionomer each, independently, comprise from 15 to 25 wt. % of the total copolymer weight. In yet another embodiment, the composition further comprises a filler.

In a further embodiment, the present invention provides a composition where the first polymer and the Ionomer components are from 30 to 100 parts, more preferably 50 to 80, even more preferably 60 to 70 parts, by weight of the composition and the filler is from 70 to 0, more preferably 50 to 20, still more preferably 40 to 30, parts by weight of the composition.

In a further embodiment, the filler comprises $BaSO_4$, $CaSiO_3$, $CaCO_3$, clay, glass fiber, or a mixture thereof. In a further embodiment, the filler comprises talc, titanium dioxide, aluminum silicate (clay), kaolin, silica, magnesium carbonate, barium carbonate, calcium sulfate, diatomaceous earth, alumina, aluminum hydroxide, magnesium hydroxide, magnesium sulfate, magnesium oxide, zinc oxide, mica, zeolite, acid clay, calcium metasilicate, calcium oxide, ceramic, borosilicate glass, or other pulp/organic filler.

In yet another embodiment, the first polymer comprises a major portion of the composition. In an alternate embodiment, the Ionomer comprises a major portion of the composition.

In one embodiment, the composition is formed into a film. In another, the composition is formed into a fluid container.

In yet another embodiment, the liquid is water.

In a further embodiment, the composition is insoluble in liquids of pH 7.0 or below and below 37° C. In another embodiment, the composition is insoluble in liquids of pH 7.0 or below and below 40° C. In yet another embodiment, the composition is insoluble in liquids of pH 7.0 or below and below 50° C. In still another embodiment, the composition is insoluble in liquids of pH 7.0 or below and below 75° C. In a further embodiment, the composition is insoluble in liquids of pH 7.0 or below and below 90° C.

In one embodiment, the composition is insoluble in liquids below pH 8.0. In yet another embodiment, the composition is insoluble in liquids below pH 9.0. In a further embodiment, the composition is insoluble in liquids below pH 10.0. In still another embodiment, the composition is insoluble in liquids below pH 11.0.

In another embodiment, the composition further comprises a second polymer of polystyrene, nylon, polyacetyl, a polyester, polyethylene, or a mixture thereof. In a further embodiment, the composition further comprises a second polymer of a low melting point polymer such as, but not limited to, ethylene vinyl acetate copolymer or ethylene methacrylate copolymer, ethylene olefin copolymer, PCL, or other polyolefin.

In a further embodiment, the present invention can be used to create novel laminates having at least two layers. In such laminates, a first layer of a hot alkaline liquid soluble or dispersable composition is used, as described elsewhere herein. A second layer can comprise a hot liquid soluble or dispersable composition other than those described herein, such as second layers made from materials that include, but are not limited to, polyvinyl alcohol. Additional layers can be used without altering the basic and novel characteristics of the laminates of the invention. For example, organic layers, such as pulp layers, can be used.

In addition to laminates, novel products can be made from fibers of the compositions of the invention when combined with other fibers. In particular, fibers according to the present invention can be woven with, for example, polyvinyl alcohol fibers to create a woven product that remains disposable or dispersable in hot, alkaline liquid. Moreover, similar fibers can be combined to make non-woven fabrics.

In another embodiment, the present invention provides a method of disposing of a hot alkaline liquid soluble or dispersable product comprising contacting the product with a hot alkaline liquid for a period of time sufficient to dissolve or disperse the product, wherein the product is comprised of a first polymer of an ethylene-acrylic acid copolymer having an acrylic acid portion, an ethylene-methacrylic acid copolymer having a methacrylic acid portion, or a mixture thereof, wherein the acrylic acid portion and the methacrylic acid portion each, independently, comprise from 10 to 30 wt. % of the total copolymer weight and an Ionomer copolymer having an acrylic acid portion, a methacrylic acid portion, or a combination thereof, comprising from 10 to 30 wt. % of the total Ionomer copolymer weight. In a further embodiment, the acrylic acid portion of the first polymer and the methacrylic acid portion of the first polymer each, independently, comprise from 15 to 25 wt. % of the total copolymer weight. In yet another embodiment, the acrylic acid portion of the Ionomer and the methacrylic acid portion of the Ionomer each, independently, comprise from 15 to 25 wt. % of the total copolymer weight.

In another embodiment of the method, the product further comprises a filler.

In a further embodiment, the present invention provides a composition where the first polymer and the Ionomer components are from 30 to 100 parts, more preferably 50 to 80, even more preferably 60 to 70 parts, by weight of the composition and the filler is from 70 to 0, more preferably 50 to 20, still more preferably 40 to 30, parts by weight of the composition.

In a further embodiment, the filler comprises $BaSO_4$, $CaSiO_3$, $CaCO_3$, clay, glass fiber, or a mixture thereof. In a further embodiment, the filler comprises talc, titanium dioxide, aluminum silicate (clay), kaolin, silica, magnesium carbonate, barium carbonate, calcium sulfate, diatomaceous earth, alumina, aluminum hydroxide, magnesium hydroxide, magnesium sulfate, magnesium oxide, zinc oxide, mica, zeolite, acid clay, calcium metasilicate, calcium oxide, ceramic, borosilicate glass, or other pulp/organic filler.

In yet another embodiment, the first polymer comprises a major portion of the composition. In an alternate embodiment, the Ionomer comprises a major portion of the composition.

In one embodiment, the composition is formed into a film. In another, the composition is formed into a fluid container.

In yet another embodiment, the liquid is water.

In a further embodiment, the product is insoluble in liquids of pH 7.0 or below and below 37° C. and the liquid is at or above 37° C. In another embodiment, the product is insoluble in liquids of pH 7.0 or below and below 40° C. and the liquid is at or above 40° C. In still another embodiment, the product is insoluble in liquids of pH 7.0 or below and below 50° C. and the liquid is at or above 50° C. In yet another embodiment, the product is insoluble in liquids of pH 7.0 or below and below 75° C. and the liquid is at or above 75° C. In a further embodiment, the product is insoluble in liquids of pH 7.0 or below and below 90° C. and the liquid is at or above 90° C.

In one embodiment, the composition is insoluble in liquids below pH 8.0. In yet another embodiment, the composition is insoluble in liquids below pH 9.0. In a further embodiment, the composition is insoluble in liquids below pH 10.0. In still another embodiment, the composition is insoluble in liquids below pH 11.0.

In one embodiment, the product is insoluble in liquids below pH 8.0 and the liquid is at or above pH 8.0. In another embodiment, the product is insoluble in liquids below pH 9.0 and the liquid is at or above pH 9.0. In still another embodiment, the product is insoluble in liquids below pH 10.0 and the liquid is at or above pH 10.0. In yet another embodiment, the product is insoluble in liquids below pH 11.0 and the liquid is at or above pH 11.0.

In another embodiment, the composition further comprises a second polymer of polystyrene, nylon, polyacetyl, a polyester, polyethylene, or a mixture thereof. In a further embodiment, the composition further comprises a second polymer of a low melting point polymer such as, but not limited to, ethylene vinyl acetate copolymer or ethylene methacrylate copolymer, ethylene olefin copolymer, PCL, or other polyolefin. By "low melting point," it is preferred that the polymer have a melting point or glass transition temperature sufficiently low to permit processing at desired processing pressures and conditions. In one embodiment, such pressures are preferably below about 5 to 10 atmospheres.

The second polymer by itself may not necessarily be soluble or dispersible in a hot alkaline liquid. After compounding with the first polymer, however, the compound should be dispersible or soluble in hot alkaline liquid. When the melting and softening point of the second polymer is lower than the temperature of the hot alkali liquid, the heat from the liquid weakens the strength of the polymer and makes it easier to break up. Thus, using low melting point second polymers in the composition is believed to aid in the disposability of the products made therefrom.

In a further embodiment, the product further comprises a second polymer of polystyrene, nylon, polyacetyl, a polyester, polyethylene, or a mixture thereof.

In yet another embodiment, the present invention provides a method of making a hot alkaline liquid soluble or dispersable product (as described above and elsewhere herein), the method comprising admixing a first polymer of an ethylene-acrylic acid copolymer having an acrylic acid portion, an ethylene-methacrylic acid copolymer having a methacrylic acid portion, or a mixture thereof, wherein the acrylic acid portion and the methacrylic acid portion each, independently, comprise from 10 to 30 wt. % of the total copolymer weight with an Ionomer copolymer having an acrylic acid portion, a methacrylic acid portion, or a combination thereof, comprising from 10 to 30 wt. % of the total Ionomer copolymer weight, and forming the mixture into a product.

In a further embodiment, the present invention provides a method of disposing of a hot alkaline liquid soluble or dispersable product by contacting the product with a hot alkaline liquid for a period of time sufficient to dissolve or disperse the product, the product comprised of either a first polymer of an ethylene-acrylic acid copolymer having an acrylic acid portion, an ethylene-methacrylic acid copolymer having a methacrylic acid portion, or a mixture thereof, wherein the acrylic acid portion and the methacrylic acid portion each, independently, comprise from 10 to 30 wt. % of the total copolymer weight, an Ionomer copolymer having an acrylic acid portion, a methacrylic acid portion, or a combination thereof, comprising from 10 to 30 wt. % of the total Ionomer copolymer weight, or a mixture thereof.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

The present invention may be understood more readily by reference to the following detailed description of preferred embodiments of the invention and the Figures.

Before the present articles and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, where publications are referenced, the disclosures of these publications in their entireties are hereby incorporated by reference into this application in order to more fully describe the state of the art to which this invention pertains.

As used herein, the term "hot" with respect to a liquid indicates a liquid at or above human body temperature, i.e., 37° C., more preferably above 40° C., even more preferably above 50° C., still more preferably above 75° C., and even more preferably above 90° C. While there is no set upper limit to "hot", one of skill in the art could readily determine an appropriate and desirable temperature without undue experimentation.

As used herein, "alkaline" refers to a liquid having a pH greater than 7.0, more preferably greater than 8.0, still more preferably greater than 9.0 or above, even more preferably greater than 10.0, still more preferably greater than 11.0, and even more preferably greater than 12.0.

As used herein, the term "soluble" refers to an article which, upon contacting with an appropriate liquid at an appropriate temperature, dissolves partially or completely into the liquid to form a solution. As used herein, the term "dispersable" refers to an article which, while not necessarily "soluble", is subject to structural weakening and breakup when subjected to a suitable liquid at a suitable temperature.

The present invention provides in one aspect a hot, alkaline liquid soluble or dispersable composition. The composition can be dissolved or dispersed, depending upon the exact formulation, in alkaline and hot liquids. The composition contains a first polymer which is either an ethylene-acrylic acid copolymer ("EAA") having an acrylic acid portion or an ethylene-methacrylic acid copolymer ("EMAA") having a methacrylic acid portion. The first polymer can also be a mixture of EAA and EMAA. In addition, the acrylic acid portion of EAA and/or the methacrylic acid portion of EMAA each, independently, comprise from 10 to 30 wt. %, more preferably 15 to 25 wt. %, of the total copolymer weight (as compared to the ethylene portion of the copolymer). The first polymer may be a random copolymer and, preferably, has a melt index of from about 1 to about 1500 (for film forming, melt indices of from 1 to 20 are preferable, while melt indices of about 10 are preferred for molding operations). One of ordinary skill in the art would recognize that deviations from the stated melt indices are possible while retaining the basic and novel characteristics of the invention, for instance, using higher melt index EAA or EMAA in combination with another low melt index polymer to create a blend with a combined melt index that is suitable for making the desired article. The molecular weight of the EAA/EMAA resin is chosen such that the final article retains the desirable hot water, alkaline solubility or dispersability. In addition, one of skill in the art would recognize that minor amounts of other comonomers may be incorporated into the copolymers of the invention, so long as the inclusion of such monomers does not alter the basic and novel utility of the end products.

In addition, a second ingredient of the composition is an Ionomer copolymer having an acrylic acid portion, a methacrylic acid portion, or a combination thereof.

In addition, the ethylene portion of the first polymer may be a further suitable, water-soluble thermoplastic.

Ionomer resins are based upon copolymers of ethylene and acrylic acid or methacrylic acid which have been partially reacted with metallic salts to form ionic crosslinks between the acid groups within the polymer chain or between neighboring chains. The cationic portion of the metallic salt is used to partially neutralize the carboxylic acid groups of the copolymer. Preferably, up to 60% of the acid groups are neutralized, more preferably 55%. Suitable cations for the metallic salts include mono-, di- and trivalent metal ions such as, but not limited to, $Na^+$, $K^+$, $Li^+$, $Cs^+$, $Rb^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Sn^{2+}$, $Pb^{2+}$, $Fe^{2+}$, $Co^{2+}$, $Ni^{2+}$, $Zn^{2+}$, $Al^{3+}$, $Sc^{3+}$, $Fe^{3+}$ and $Y^{3+}$. Preferred cations include sodium, lithium and potassium ions. The Ionomer may be a random copolymer and the Ionomer, preferably, has a melt index of from about 1 to about 20. For film forming, a melt index of from about 1 to about 10 is preferred. One of ordinary skill in the art would recognize that deviations from the stated melt indices are possible while retaining the basic and novel characteristics of the invention. The molecular weight of the Ionomer is chosen such that the final article retains the desirable hot water, alkaline solubility or dispersability.

For the purposes of the present invention, the acrylic acid portion or methacrylic acid portion of the Ionomer comprises from 10 to 30 wt. %, more preferably 15 to 25 wt. %, of the total Ionomer copolymer weight.

Each of the copolymeric ingredients can be in any processable form, such as thermoplastically processable powder or granular materials. In addition, the form can be such as is used for injection molding, compression molding, blow molding, sheet molding, formation of pressed or laminated articles, film, foaming, etc.

The first polymer and the Ionomer may be blended by any conventional blending method.

Pursuant to the present invention, it has been surprisingly found that the above-referenced composition is hot water and alkaline soluble or dispersable and thus, cold water and non-alkaline insoluble and non-dispersable. This surprising finding demonstrates that the articles are suitable for a wide variety of utilities where other plastics had heretofore been useful. Moreover, articles formed of the new composition are readily disposable. In addition, many of the articles formed from the novel compositions set forth herein are also non-toxic and degradable.

In addition, the above-described composition may include one or more fillers. Suitable fillers include those generally known in the art, such as $BaSO_4$, $CaSiO_3$, $CaCO_3$, clay, glass fiber, or a mixture thereof. In addition, for the purposes of the present invention, it is preferable that the fillers be hot water and alkaline soluble or dispersable so as to maintain the disposability of the articles made therefrom. In further embodiments, the filler comprises talc, titanium dioxide, aluminum silicate (clay), kaolin, silica, magnesium carbonate, barium carbonate, calcium sulfate, diatomaceous earth, alumina, aluminum hydroxide, magnesium hydroxide, magnesium sulfate, magnesium oxide, zinc oxide, mica, zeolite, acid clay, calcium metasilicate, calcium oxide, ceramic, borosilicate glass, or other pulp/organic filler.

In addition, other fillers and additional ingredients that can be used include plasticizers, antifoaming agents and surfactants, lubricants, parting agents, stabilizers, pigments, dyes, brighteners, antioxidants, waxes, foaming agents, blowing agents, antistatic, antiblocking and other processing aids generally known in the polymer art. However, it is desirable that such additional ingredients be chosen such that the articles formed as described herein remain hot water and alkaline soluble or dispersable and without otherwise altering the basic and novel characteristics of the present invention.

The compositions of the present invention may be formulated such that the first polymer component (EAA/EMAA) and the Ionomer component together comprise from 30 to 100 parts by weight of the composition and the filler is from 70 to 0 parts by weight of the composition (where the composition has a total weight of 100 parts by weight). It is also possible, and sometimes desirable, that no filler is used and an embodiment made in the absence of any filler is contemplated. In a further preferable embodiment, the first polymer component (EAA/EMAA) and the Ionomer component together comprise from 50 to 80 parts by weight of the composition and the filler is from 50 to 20 parts by weight of the composition. In yet a further preferred embodiment, the first polymer component (EAA/EMAA) and the Ionomer component together comprise from 60 to 70 parts by weight of the composition and the filler is from 40 to 30 parts by weight of the composition. For forming a film, it is preferable that the filler comprise less than 40 parts by weight.

The ratios of EMAA/EAA to Ionomer as well as the presence or absence of filler are used to alter the physical characteristics of the resulting article. Therefore, in one embodiment, characterized by its softness and, therefore, its suitability for forming films and filaments, the first polymer comprises a major portion of the composition. By major portion it is intended to mean that the component comprises over 50% by weight of the total weight of the composition (excluding the presence of any fillers). It has been found that increasing the proportion of EAA/EMAA to Ionomer leads to softer articles.

In an alternate embodiment, the Ionomer comprises a major portion of the composition. Such articles have been found to be more rigid and thus are suitable for forming liquid containers and other articles where rigidity is desirable. In addition, the use of fillers as set forth above can enhance the rigidity of articles made from the compositions of the present invention.

In addition, further products suitable for hot water and alkaline liquid disposal may be formulated using 100% Ionomer (to the exclusion of EAA/EMAA) or 100% EAA/EMAA (to the exclusion of Ionomer) polymer. Such products may include fillers depending upon the desired final properties of the product.

Moreover, additional polymers may be blended in to provide for further desirable characteristics. One suitable class of such polymers is those polymers having a high modulus. For instance, polypropylene, polymethyl methacrylic acid, high density polyethylene, polycarbonates, ABS (acrylonitrile butadiene styrene), polystyrene or nylon may be used to lower the cost of the article and to reduce the quantity of Ionomer needed for the desired properties. In addition, polyacetyl may be used because, like polystyrene, it possesses a high modulus and thus can be used to both lower the cost of the article as well as increase the modulus of the article. One of ordinary skill in the art would recognize that other common polymers, such as (low density) polyethylene or polyesters, could be blended in for similar or varied purposes. However, it is desirable to limit the amount of such additional polymers in order to provide a final article which is either hot liquid and alkaline soluble or, at least, dispersable.

In addition, the composition can further include low melting point polymers such as, but not limited to, ethylene vinyl acetate copolymer or ethylene methacrylate copolymer, ethylene olefin copolymer, PCL, or other polyolefin.

With these parameters in mind, the present invention provides the above composition formed into various products including, but not limited to, films, fluid containers, and the like. However, it must be emphasized that the present composition can be formulated into almost any article traditionally manufactured from known plastics. In addition, the ease of processability of the ingredients of the compositions described herein and used to form articles is surprising in and of itself. In particular, the use of EAA, EMAA and Ionomer permits production using standard polyethylene processing equipment. Moreover, the present components provide for temperature and pressure variations in a wide operating window without destroying the utility of the final article, thereby further aiding the processing of articles made from the described components.

In a preferred embodiment, the liquid which may contact, but preferably does not dissolve or disperse the articles until the user of the article desires to dispose of the article by using a sufficiently hot alkaline liquid, is water. Disposability is desired through either dissolution or dispersion by contacting the composition with a liquid, such as water, which is either of sufficient alkalinity or of sufficient temperature to dissolve or disperse the composition. Thus, by varying the proportions of the ingredients of the composition, the present invention provides a composition which is insoluble in liquids of above pH 7.0 below 37° C., more preferably insoluble in liquids of above pH 7.0 below 40° C., even more preferably, insoluble in liquids of above pH 7.0 below 50° C., more preferably insoluble in liquids of above pH 7.0 below 75° C., and most preferably, insoluble in liquids of above pH 7.0 below 90° C.

In addition to the temperature sensitivity, it may be necessary to dissolve or disperse the article in a solution that is, at least, slightly alkaline (i.e., having a pH of above 7.0). In a preferred embodiment, the composition, is insoluble in liquids below pH 8.0, more preferably the composition is insoluble in liquids below pH 9.0, even more preferably the composition is insoluble in liquids below pH 10.0, and still more preferably, the composition is insoluble in liquids below pH 11.0. An alkaline solution can be made by using a known base, such as NaOH or KOH, capable of raising the pH of the dissolution/dispersion liquid to a suitable or desirable alkaline pH.

In yet another embodiment, the present invention provides a method of disposing of a hot alkaline liquid soluble or dispersable product. The method involves contacting the product with a hot alkaline liquid for a period of time sufficient to dissolve or disperse the product, wherein the product is comprised of the above-described composition. In particular, the solution pH is adjusted to the desired alkalinity, e.g., above 7.0, and the temperature raised to, e.g., 90° C. Then the articles to be disposed of are introduced and the mixture is agitated for, e.g., 2 to 30 minutes.

In a preferred embodiment of the method, the product is insoluble in liquids of pH 7.0 or below and below 37° C. and the liquid is at or above 37° C. In yet another embodiment, the product is insoluble in liquids of pH 7.0 or below and below 40° C. and the liquid is at or above 40° C. In still a further embodiment, the product is insoluble in liquids of pH 7.0 or below and below 50° C. and the liquid is at or above 50° C. In yet another embodiment, the product is insoluble in liquids of pH 7.0 or below and below 75° C. and the liquid is at or above 75° C. In yet another embodiment, the product is insoluble in liquids of pH 7.0 or below and below 90° C. and the liquid is at or above 90° C.

Alternatively, the disposal method involves the disposal of a product which is formulated to be insoluble in liquids below pH 8.0 and the liquid is at or above pH 8.0. In yet another embodiment, the product is insoluble in liquids below pH 9.0 and the liquid is at or above pH 9.0. In still a further embodiment, the product is insoluble in liquids below pH 10.0 and the liquid is at or above pH 10.0. In yet another embodiment, the product is insoluble in liquids below pH 11.0 and the liquid is at or above pH 11.0.

In another embodiment, the present invention provides a method of making a hot alkaline liquid soluble or dispersable product. The method of making comprises admixing a first polymer of an ethylene-acrylic acid copolymer having an acrylic acid portion, an ethylene-methacrylic acid copolymer having a methacrylic acid portion, or a mixture thereof, wherein the acrylic acid portion and the methacrylic acid portion each, independently, comprise from 10 to 30 wt. % of the total copolymer weight with an Ionomer copolymer having an acrylic acid portion, a methacrylic acid portion, or a combination thereof, comprising from 10 to 30 wt. % of the total Ionomer copolymer weight. The admixture is then formed into a desired product, such as a film, fluid container and the like. The composition used may vary as stated hereinabove to provide for the various desirable products as also set forth herein.

The above-described method can be used to make various products, including films, filaments, laminates (with, e.g., paper foil), injection molded articles, thermoformed articles, blow molded, and foamed articles.

For instance, the presently described compositions can be used to form a film (or other article where the filler comprises less than about 40 parts by weight of the article) by blending together the ingredients in a premix. The blended mixture is then delivered to an extruder (Leistritz, 50 mm) at a temperature of from 100 to about 300° C. The extruded film may be either blown or cast, depending upon the desired product. Alternately, especially when the amount of filler is greater than about 40 parts by weight, mixing can occur in-line in the extruder itself and the choice is a matter of preference and processability. The use of EAA/EMAA and Ionomer provides for advantages in processability with respect to temperature and composition tolerance. Thus, it is quite adequate to premix the ingredients in a conventional manner rather than necessitating the more precise in-line extrusion method. However, the in-line extrusion method may also be used, if desired.

In addition, a rigid article can be made using a similar procedure. As described above, more Ionomer and/or filler is used to impart rigidity to such articles. The article is formed by premixing the ingredients and supplying them to an extruder as above. However, the extruded material may then be used to thermoform or injection mold a desired rigid article.

One of ordinary skill in the art would be able to apply various other processing methodologies to form other desired products. For instance, the composition could be extruded through a suitable die to form a tubular article.

In addition, a lamination using the composition of the invention can be formed. Such a lamination is formed by applying the extruded hot water and alkaline soluble or dispersable material, as described herein, to a substrate. For disposability, it is preferred that the substrate either be dissolvable in conformance with the polymeric ingredients or, at least, be dispersable under the conditions described herein. Thus, a paper foil could be used as a substrate.

In addition, the present composition could be foamed by known processes and thus could be formed into articles similar to the current uses for Styrofoam. Cups and plates could be readily manufactured in this fashion with the added benefit that such cups and plates could be disposed of readily in a regular household dishwasher or the like.

In addition, disposable eating utensils could be made of the materials of the present invention.

In a further embodiment, the present invention can be used to create novel laminates. The laminates have a first layer of a hot alkaline liquid soluble or dispersable composition as described herein. The second layer is a hot liquid soluble or dispersable composition other than those described above. Such second layers can be made from materials that include, but are not limited to, polyvinyl alcohol.

Figure 1:
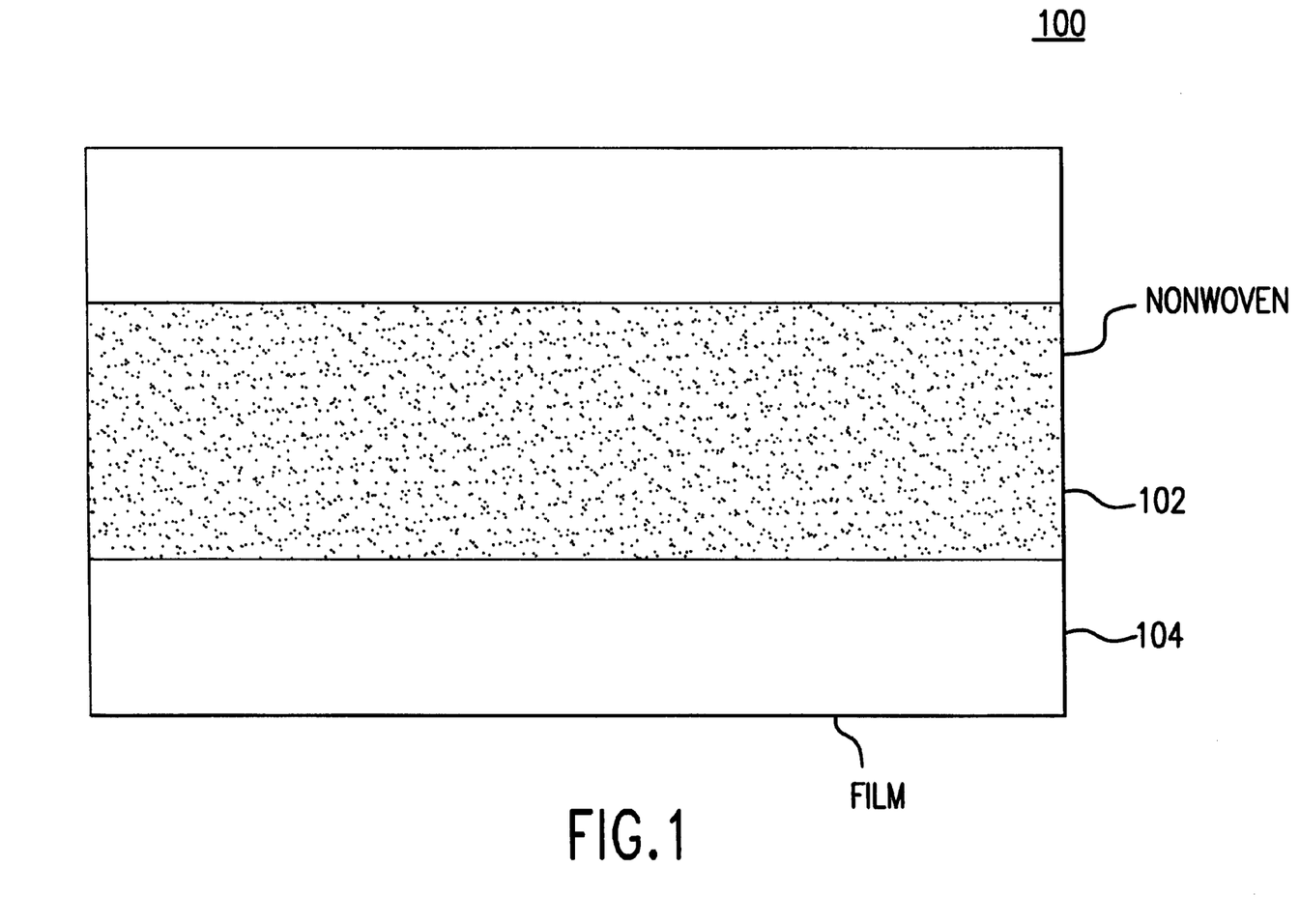
FIG. 1 shows a schematic overview of a table stand cover made using the compositions of the invention.
Figure 2:
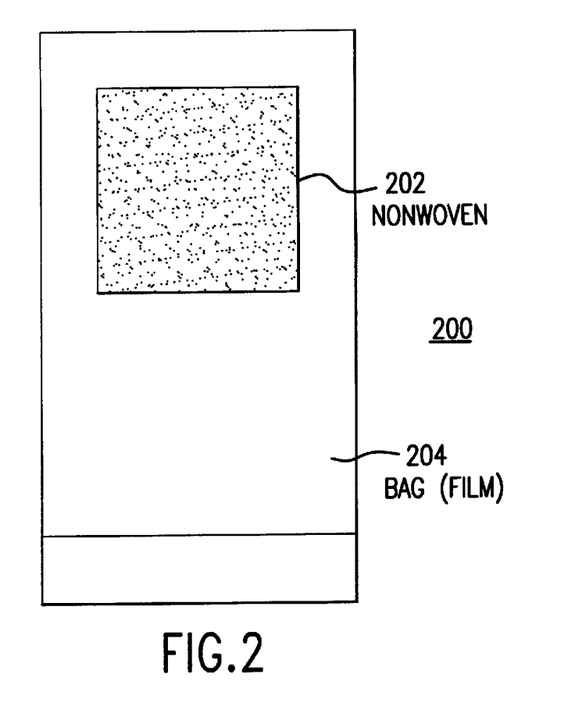
FIG. 2 shows a schematic overview of a mayo stand cover made using the compositions of the invention.

In yet further embodiment, the present invention can be used to create additional novel articles such as table covers (FIG. 1), mayo stand covers (FIG. 2), and hamper bags (not shown). For instance, to make a table cover, a layer of a dispersible nonwoven fabric 102 can be laminated with a film layer 104 to create the table cover 100. Similarly, a mayo stand cover 200 can be constructed by laminating a nonwoven layer 202 onto an appropriately shaped film bag 204.

Figure 3:
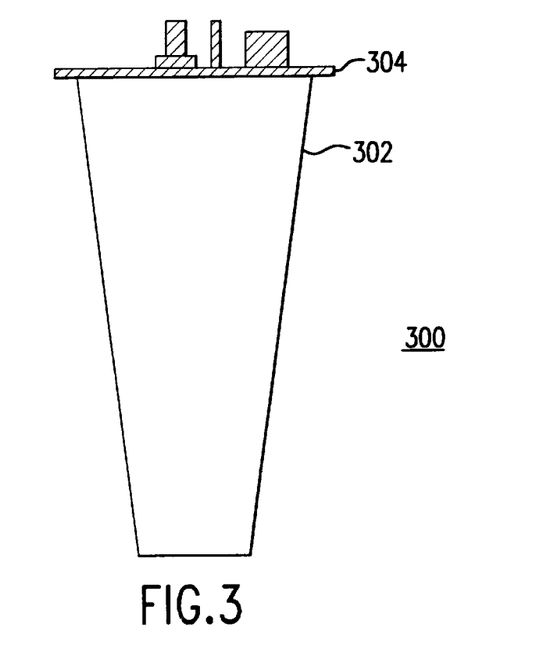
FIG. 3 shows a schematic overview of a novel suction canister made using the compositions of the invention.

In yet another embodiment, referring now to FIG. 3, the present materials can be used to create a novel infectious waste container 300 ("suction canister") for containing, e.g., body fluids. This container is disposable without significant risk to hospital personnel. In particular, the container comprises a bag 302 made from the present materials and is capable of capturing bodily fluids, such as those created during surgical procedures. The container has a connector/inlet portion 304 and a fluid containment bag 302. After use, this container may be disposed of using the methods described hereinbelow.

In addition, the present materials can be used to create fiber based products having unique properties. In a compact fiber production line, for example, using a 105 mm single screw extruder and a spinneret of 45,000 holes or 119,000 holes, fibers have been successfully spun, drawn, crimped and cut. The extruder and spin pack temperatures were about 230° C. using a composition that is a 50/50 mixture of Ionomer and ethylene-olefin copolymer. The fibers made from these materials can be used to make woven and nonwoven fabrics which are soluble or dispersible in hot alkali liquid.

As noted in the background above, the medical industry produces numerous articles of medical waste. With the materials of the present invention, such medical waste could be formed of the disposable and/or dispersable materials described herein and thus safely and effectively disposed of without further risk to the caregiver and others in the medical industry. In addition, where disposal takes place in sufficiently hot and basic conditions, disinfection of the waste product can be carried out simultaneously, which introduces further surprising economies made possible only through the use of the present invention. Furthermore, the disposal solution may be treated with an acid to recover the polymeric ingredients, should such recycling be desirable to the particular end-user.

The preferred embodiments of the above-described articles and methods are set forth in the following examples. Other features of the invention will become apparent from the following examples, which are for illustrative purposes only and are not intended as a limitation upon the present invention.

The following examples are set forth so as to provide those of ordinary skill in the art with a complete disclosure and description of how the compositions and articles claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. and is at room temperature, and pressure is at or near atmospheric.

EXAMPLE I

The following formulations were used to produce various articles (see Tables I and II).

TABLE I

Sample Formulations (numbers indicate parts by weight)

| Sample | EAA* | Iono-mer** | Filler | | Wax | Pigment | |
| | | | $BaSO_4$ | $CaSiO_3$ | | Blue | Green |
|---|---|---|---|---|---|---|---|
| A | 60 | 0 | 30 | 0 | N/A | N/A | N/A |
| B | 30 | 30 | 30 | 0 | N/A | N/A | N/A |
| C | 40 | 20 | 30 | 0 | N/A | N/A | N/A |
| D | 50 | 10 | 30 | 0 | N/A | N/A | N/A |

TABLE I-continued

Sample Formulations (numbers indicate parts by weight)

| Sample | EAA* | Ionomer** | Filler BaSO₄ | Filler CaSiO₃ | Wax | Pigment Blue | Pigment Green |
|---|---|---|---|---|---|---|---|
| E | 0 | 60 | 0 | 30 | 3 | .005 | .008 |
| F | 50 | 50 | 0 | 0 | 2 | N/A | N/A |

*Primacor ® 5980I Polymer (Dow Chemical Company, Midland, MI 48674) (ethylene-acrylic acid copolymer, white pellets or granules, slightly acidic odor, insoluble in water, specific gravity 0.91–0.97, melt index of about 300)
**Surlyn ® 8220 (Du Pont Packaging & Industrial Polymers, 1007 Market Street, Wilmington, DE 19898) (ionomer resin of ethylene/methacrylic acid copolymers, partial magnesium, sodium or zinc salt, melting point 80–100° C., negligible solubility in water, negligible % volatiles, mild methacrylic acid odor, white pellets, melt index of about 1)

Samples A–D were formed into films as described above. Samples E and F were used for thermoforming more rigid articles (in this case trays) as described above.

TABLE II

Sample Formulations (numbers indicate parts by weight)

| Sample | Ingredient 1 | Parts | 2 | Parts | 3 | Parts | Disp. pH | Use |
|---|---|---|---|---|---|---|---|---|
| G | Surlyn 8220 | 60 | BaSO₄ | 30 | N/A |  | 9–11 | Film |
| H | Surlyn 8220 | 60 | BaSO₄ | 30 | Polyethylene* | 30 | 9–11 | Film |
| I | Surlyn 8220 | 30 | BaSO₄ | 30 | Polyethylene* | 30 | 9–11 | Film |
| J | AD8548 | 60 | BaSO₄ | 30 | Wax** |  | 9–11 | Film |
| K | Surlyn 8220 | 60 | BaSO₄ | 30 | N/A |  | 9–11 | Thermoform |
| L | Surlyn 8220 | 60 | BaSO₄ | 30 | Polystyrene*** | 10 | 9–11 | Thermoform |
| M | Surlyn 8220 | 60 | BaSO₄ | 30 | Polystyrene*** | 20 | 9–11 | Thermoform |
| N | Surlyn 8220 | 60 | BaSO₄ | 30 | Polystyrene*** | 30 | 9–11 | Thermoform |
| O | Surlyn 8220 | 60 | BaSO₄ | 30 | Polystyrene*** | 40 | 9–11 | Thermoform |
| P | Surlyn 8220 | 60 | BaSO₄ | 30 | Polystyrene*** | 50 | 9–11 | Thermoform |
| Q | Surlyn 8220 | 60 | BaSO₄ | 30 | Polystyrene*** | 60 | 9–11 | Thermoform |

Surlyn ® 8220 Ionomer (Du Pont, see Table I)/AD8548 Ionomer (Du Pont, see Table I Surlyn details)
*Exact ® 4011 (Exxon Chemical Company, P.O. Box 3272, Houston, TX 77253-3272) (ethylene-olefin copolymer CAS #25087-34-7, odorless opaque white pellets, specific gravity of 0.88–0.92, insoluble in water, melting point 150 to 212° F., melt index of about 60)
**Wax H-12 (Hoechst Celanese Corp., Specialty Chemicals, P.O. Box 1026, Charlotte, N.C. 28201-1026) (polyethylene wax, oxidized, off-white fine grains, density 0.64–0.96 g/cc, insoluble in water, acid number 15–19 MG KOH/G, saponification number 30–45 MG KOH/G, drop point 100–108° C.)
***High Impact Polystyrene EA6740 (Chevron Chemical Co., U.S. Chemicals Div., P.O. Box 3766, Houston, TX 77253-3766) (polystyrenes, prime grades, less than 1000 ppm styrene, opaque odorless pellets, melting point 170–230° F., insoluble in water, soluble in hydrocarbon solvents, specific gravity 1.03, evaporation rate 0, percent volatile < 0.1%)

For the compositions in Table II, the thermoformed articles were trays.

For each of the above samples, the following testing protocol was conducted. For each such sample, a 500 ml beaker was filled with 250 g. of water and a stir bar was placed in the beaker. The beaker was set on hot/stir plate and was covered with a watch glass. The heating element of the hot plate was then turned on. A thermometer was secured to the beaker so that the end of the thermometer was fully submerged in water, but not interfering with stir bar. The water was heated to a stable temperature of 90–95° C. After the temperature was stabilized, 0.3 g. of a selected base (e.g., NaOH) was added to the beaker and stirred until dissolved. The pH of the solution can be taken and recorded at this point. After the base was dissolved, 1.5 g. of the sample was added to the beaker and stirring was continued at the highest setting for 30 minutes. After 30 minutes, the beaker was removed from the hot/stir plate and allowed to cool. When the solution cooled below 40° C., the pH of the solution was recorded. Successful dispersion or dissolution was determined visually by verifying production of relatively small particle size and by the presence of suspended solids in the solution.

Using this protocol, all of the samples were successfully dissolved or dispersed.

EXAMPLE II

Blown Film

| Ionomer Surlyn ® 8220 | EMAA Nucrel ® RX8419 | EAA Primacore ® XU 60758.05 | Polyolefin Exact ® 4011 | Filler |
|---|---|---|---|---|
| 1 | 60 |  |  |  | 35 |
| 2 | 30 |  |  | 30 | 30 |
| 3 |  | 30 |  | 30 | 15 |
| 4 |  | 30 |  | 30 | 25 |

-continued

| Ionomer Surlyn ® 8220 | EMAA Nucrel ® RX8419 | EAA Primacore ® XU 60758.05 | Polyolefin Exact ® 4011 | Filler |
|---|---|---|---|---|
| 5 |  | 30 |  | 30 | 15 (Talc) |
| 6 |  | 30 |  | 30 | 25 (Talc) |
| 7 |  | 15 | 15 | 30 (Exact ® 4006, 4023) | 15 (Talc) |

Other ingredients, such as wax, color pigment, antistats, fragrance, can also be added.

A preferred formulation is as follows:

| Ingredients | EMAA - Nucrel ® RX 8419 (DuPont) | 30 |
| --- | --- | --- |
| | Ethylene-olefin copolymer - Exact ® 4011 (Exxon Chemical Company) | 30 |
| | Filler - BaSO$_4$ | 35 |
| Process | Blown film line (usable for low density polyethylene), using a single screw extruder with the extruder and die temperature at about 250° F. | |
| Products | Film, tube, bag | |
| Disposal pH | 9–12 | |

EXAMPLE III
Cast Film

| Film | Ionomer Surlyn ® 8220 | EMAA Nucrel ® RX8419 | EAA Primacore ® XU 60758.05 | Polyolefin Exact ® 4011 | Filler BaSO$_4$ |
| --- | --- | --- | --- | --- | --- |
| 8 | 60 | | | | 35 |
| 9 | 30 | | | 30 | 30 |
| 10 | | 30 | | 30 | 15 |
| 11 | | 15 | 15 | 30 (Exact ® 4006, 4042) | 15 (Talc) |
| 12 | 60 | | | | 55 |
| 13 | 60 | | | | 75 |
| 14 | | 60 | | | 35 |
| 15 | | 60 | | | 75 |
| 16 | | 30 | | 30 | 35 |
| 17 | | 30 | | 30 | 75 |
| 18 | 30 | | | 30 | 35 |
| 19 | 30 | | | 30 | 75 |
| 20 | 30 | | | 30 | 90 |
| 21 | | 25 | 25 | 50 | |
| 22 | | 50 | 25 | 25 | |

Other ingredients, such as wax, color pigment, antistats, fragrance, can also be added.

A preferred formulation is as follows:

| Ingredients | EMAA - Nucrel ® RX 8419 | 30 |
| --- | --- | --- |
| | Ethylene-olefin copolymer - Exact ® 4011 | 25 |
| | EAA - Primacore ® XU60758.05 | 25 |
| Process | Cast film line using a single screw extruder having an extruder and die temperature of about 340° F. | |
| Products | Film | |
| Disposal pH | 9–12 | |

EXAMPLE IV
Extrusion Coating/Laminate

| | film/nonwoven nonwoven/film/nonwoven | | | 2 layers 3 layers | |
| --- | --- | --- | --- | --- | --- |
| Film | Ionomer Surlyn ® 8220 | EMAA Nucrel ® RX8419 | EAA Primacore ® XU 60758.05 | Polyolefin Exact ® 4011 | Filler BaSO$_4$ |
| 23 | | 30 | | 30 | 15 |
| 24 | | 15 | 15 | 30 (Exact ® 4006, 4042) | 15 (Talc) |
| 25 | | 25 | 25 | 50 | |
| 26 | | 50 | 25 | 25 | |
| 27 | 100 | | | | |
| 28 | | 100 | | | |

Other ingredients, such as wax, color pigment, antistats, fragrance, can also be added.

A preferred formulation is as follows:

| Ingredients | EMAA - Nucrel ® RX 8419 | 15 |
| --- | --- | --- |
| | EAA - Primacore ® | 15 |
| | Ethylene-olefin copolymer - Exact ® 4042 | 30 |
| | Filler - Talc | 15 |
| Substrate | Nonwoven poly(vinyl) alcohol fabric | |
| Process | Extrusion lamination using a single screw extruder having an extruder and die temperature of approx. 340° F. | |
| Products | Film/nonwoven laminate | |
| Disposal pH | 9–12 | |

EXAMPLE V

Injection Molding

| | Ionomer Surlyn ® 8220 | Poly-styrene EA 6740 | EAA Primacore ® XU 60758.05 | Polyolefin Exact ® 4011 | Filler Talc |
| --- | --- | --- | --- | --- | --- |
| 29 | 40 | 20 | 10 | | 15 |
| 30 | 35 | 25 | 15 | | |
| 31 | 35 | 25 | | | |
| 32 | 60 | | | | 35 (BaSO$_4$) |
| 33 | 30 | | 30 | 30 | 10 |

Other ingredients, such as wax, color pigment, antistats, fragrance, can also be added.

A preferred formulation is as follows:

| Ingredients | Ionomer - Surlyn ® 8220 (DuPont) | 40 |
| --- | --- | --- |
| | Polystyrene - High Impact Polystyrene EA 6740 (Chevron Chemical Co.) | 20 |
| | EAA - Primacore ® XU 60758.05 | 30 |
| | Filler- Talc | 15 |
| Process | Injection molding machine having an extruder and die temperature of about 400° F. and a mold temperature of about 70° F. | |
| Products | Molded parts | |
| Disposal pH | 9–12 | |

EXAMPLE VI
Blow Molding

| Ionomer Surlyn ® 8220 | EMAA Nucrel ® RX8419 | EAA Primacore ® XU 60758.05 | Polyolefin Exact ® 4011 | Filler Talc |
|---|---|---|---|---|
| 34 |  | 30 | 30 | 30 (Exact ® 4006) |
| 35 | 30 |  | 30 | 30 |
| 36 |  | 30 | 30 | 30 |
| 37 | 30 |  | 30 | 30 | 10 |

Other ingredients, such as wax, color pigment, antistats, fragrance, can also be added.

A preferred formulation is as follows:

| Ingredients | Ionomer - Surlyn ® 8220 | 30 |
|---|---|---|
|  | Ethylene-olefin copolymer - Exact ® 4011 | 30 |
|  | EAA - Primacore ® XU 60758.05 | 30 |
|  | Filler - Talc | 10 |
| Process | Blow molding machine | |
| Products | Blow molded parts | |
| Disposal pH | 9–12 | |

EXAMPLE VII
Fiber

| Ionomer Surlyn ® 8220 | EMAA Nucrel ® RX8419 | EAA Primacore ® XU 60758.05 | Polyolefin Exact ® 4011 |
|---|---|---|---|
| 38 | 30 |  | 30 |
| 39 |  | 50 | 25 | 25 |

Other ingredients, such as wax, color pigment, antistats, fragrance, can also be added.

A preferred formulation is as follows:

| Ingredients | Ionomer - Surlyn ® 8220 | 30 |
|---|---|---|
|  | Ethylene-olefin copolymer - Exact ® 4011 | 30 |

Other ingredients, such as color pigment, antistats, can also be added without changing the process conditions.

Process: Compact fiber line for PP, PET using a single screw extruder having an extruder an spin pack temperature of about 230° C.
Products: Staple fiber, filament
Disposal pH: 9–12

EXAMPLE VIII
Thermoforming

| Ionomer Surlyn ® 8220 | Poly-styrene EA 6740 | EAA Primacore ® XU 60758.05 | Polyolefin Exact ® 4011 | Filler Talc |
|---|---|---|---|---|
| 40 | 40 | 20 | 10 |  | 15 |
| 41 |  | 35 | 25 | 15 |  |
| 42 | 35 | 25 |  |  |  |
| 43 | 30 |  | 30 | 30 | 10 |

Other ingredients, such as was, color pigment, antistats, fragrance, can also be added.

A preferred formulation is as follows:

| Ingredients | Ionomer - Surlyn ® 8220 | 35 |
|---|---|---|
|  | Polystyrene - High Impact Polystyrene EA 6740 | 25 |
|  | Filler - Talc | 15 |
| Products | Thermoformed parts | |
| Disposal pH | 9–12 | |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of disposing of a hot alkaline liquid soluble or dispersable product comprising immersing the product in a hot alkaline liquid for a period of time sufficient to dissolve or disperse the product in a dispersion or solution and disposing the dispersion or solution, wherein the product consists essentially of:
    (a) one or more hot alkaline soluble or dispersable first components selected from the group consisting of:
        (i) an ethylene-acrylic acid copolymer having an acrylic acid portion, the total copolymer weight, wherein the acrylic acid portion comprises from 10 to 30 wt. % of the total copolymer weight,
        (ii) an ethylene-methacrylic acid copolymer having a methacrylic acid portion, wherein the methacrylic acid portion comprises from 10 to 30 wt. % of the total copolymer weight, and
        (iii) an Ionomer copolymer having an acid portion comprised of acrylic acid and/or methacrylic acid, wherein the acid portion of the Ionomer is from 10 to 30 wt. % of the total Ionomer weight and is at least partially neutralized, and
    (b) one or more second components selected from the group consisting of ethylene vinyl acetate copolymer, ethylene methacrylate copolymer, ethylene olefin copolymer, polyolefin, polypropylene, polyethylene, polycarbonate, acrylonitrile butadiene styrene, polystyrene, nylon, and mixtures thereof.

2. The method of claim 1, wherein the product further consists essentially of one or more fillers selected from the group consisting of $BaSO_4$, $CaSiO_3$, $CaCO_3$, glass fiber, talc, titanium dioxide, aluminum silicate, clay, kaolin, silica, magnesium carbonate, barium carbonate, calcium sulfate, diatomaceous earth, alumina, aluminum hydroxide, magnesium hydroxide, magnesium sulfate, magnesium oxide, zinc oxide, mica, zeolite, acid clay, calcium metasilicate, calcium oxide, ceramic, borosilicate glass, or other pulp/organic filler, or a mixture thereof.

3. The method of claim 1, wherein the product further consists essentially of:

(c) one or more additional ingredients selected from the group consisting of plasticizers, antifoaming agents, surfactants, lubricants, parting agents, stabilizers, pigments, dyes, brighteners, antioxidants, waxes, foaming agents, blowing agents, antistatic aids, antiblocking aids, and processing aids.

4. The method of claim 1, wherein the hot alkaline liquid has a temperature at or above approximately 90° C.

5. The method of claim 4, wherein the hot alkaline liquid has a pH above approximately 11.0.

6. The method of claim 5, wherein the product dissolves or disperses in the hot alkaline liquid within about 2 minutes to about 30 minutes.

7. The method of claim 1, wherein:

(a) is an ethylene-acrylic acid copolymer having an acrylic acid portion, wherein the acrylic acid portion comprises from 10 to 30 wt. % of the total copolymer weight, or an ethylene-methacrylic acid copolymer having a methacrylic acid portion, wherein the methacrylic acid portion comprises from 10 to 30 wt. % of the total copolymer weight or mixtures thereof, and (b) is an ethylene-olefin copolymer.

8. The method of claim 7, wherein (b) further includes a filler.

9. The method of claim 5, wherein the product is agitated.

10. The method of disposing of a hot alkaline liquid soluble or dispersable product comprising immersing the product in a hot alkaline liquid for a period of time sufficient to dissolve or disperse the product in a dispersion or solution and disposing the dispersion or solution, wherein the product consists essentially of:

(a) an ethylene-acrylic acid copolymer having an acrylic acid portion, wherein the acrylic acid portion comprises from 10 to 30 wt. % of the total copolymer weitht, or an ethylene-methacrylic acid copolymer having a methacrylic acid portion, wherein the methacrylic acid portion coprises from 10 to 30 wt. % of the total copolymer weight, and (b) an ethylene-olefin copolymer.

11. The method of claim 10, wherein the product further consists essentially of a filler.

* * * * *